United States Patent

Kozakai

[11] Patent Number: 5,704,694
[45] Date of Patent: Jan. 6, 1998

[54] TRACTION CONTROL DEVICE FOR VEHICLE

[75] Inventor: Asao Kozakai, Anjo, Japan

[73] Assignee: Aisin Seiki Kabushiki Kaisha, Kariya, Japan

[21] Appl. No.: 565,005

[22] Filed: Nov. 30, 1995

[30]   Foreign Application Priority Data

Nov. 30, 1994  [JP]  Japan ................. 6-297459

[51]  Int. Cl.$^6$ ................................................. B60T 8/58
[52]  U.S. Cl. .................. 303/113.2; 91/376 R; 91/32; 303/114.3
[58]  Field of Search ................ 303/9.71, 10, 11, 303/122.09, 122.12, 122.15, 139, 113.2, 113.3, 114.3, 116.1, 116.2, DIG. 1–4; 91/376 R, 32; 92/48

[56]   References Cited

U.S. PATENT DOCUMENTS

| | | | |
|---|---|---|---|
| 4,453,450 | 6/1984 | Horsting | 91/376 R X |
| 4,979,426 | 12/1990 | Schiel et al. | 303/113.3 X |
| 5,098,170 | 3/1992 | Watanabe | 303/113.3 |
| 5,188,435 | 2/1993 | Willmann | 303/113.2 |
| 5,357,846 | 10/1994 | Rudolph et al. | 92/48 |
| 5,586,814 | 12/1996 | Steiner | 303/113.2 X |

FOREIGN PATENT DOCUMENTS

| | | | |
|---|---|---|---|
| 4123637 | 1/1993 | Germany | 303/114.3 |
| 5-4572 | 1/1993 | Japan . | |
| 5105073 | 4/1993 | Japan | 303/114.3 |
| 2219368 | 12/1989 | United Kingdom | 303/114.3 |

*Primary Examiner*—Josie Ballato
*Attorney, Agent, or Firm*—Burns, Doane, Swecker & Mathis, LLP

[57]   ABSTRACT

A traction control device includes a vacuum booster connected to a master cylinder. The master cylinder is in fluid communication with a driven wheel brake and a non-driven wheel brake via respective first and second solenoid valves. When the brake traction control initiation condition is established, the booster is activated to supply fluid pressure from the master cylinder to the driven wheel brake and the non-driven wheel brake. After elapse of a time from the activation of the booster, the second solenoid valve is closed to prevent a further increase of the brake fluid pressure in the non-driven wheel brake. Thereafter, the brake fluid pressure in the driven wheel brake is adjusted by controlling the first solenoid valve as well as by controlling a fluid pressure pump which is associated with the fluid communication between the master cylinder and the driven wheel brake.

9 Claims, 8 Drawing Sheets

TRACTION CONTROL DEVICE FOR VEHICLE

FIELD OF THE INVENTION

The present invention relates to the control of vehicle wheels, and more particularly to a traction control device for a vehicle which prevents wheels from spinning during acceleration.

BACKGROUND OF THE INVENTION

In a conventional traction control device for a vehicle such as that disclosed in, for example, Japanese Patent Application Publication No. 5(1993)4572 issued without examination on Jan. 14, 1993, the driven wheels are braked by activating a booster, and the supply of brake fluid pressure to each of the non-driven wheels is interrupted for preventing a differential lock of such wheels.

However, the activation of the booster and the prevention of the brake fluid pressure supply means that the raising of the brake fluid pressure becomes faster than usual. Thus, if the master cylinder is a so called "Rockled type", the piston cup may become damaged by entering into the compensating port.

SUMMARY OF THE INVENTION

A need exists, therefore, for a traction control device for an automotive vehicle which eliminates the foregoing drawback.

It would also be desirable to provide a vehicle brake traction control device which can employ any kind of master cylinder.

To address the foregoing points, the traction control device for a vehicle in accordance with the invention includes a master cylinder in which is defined a first fluid pressure chamber and a second fluid pressure chamber, and a vacuum brake booster having a main control valve and an auxiliary control valve. The main control valve transmits a pedal force to the master cylinder while the auxiliary control valve applies a force to the master cylinder in the absence of a pedal force. A driven wheel brake is connected with the first fluid pressure chamber via a first fluid passage and is supplied with a first brake fluid pressure from the first fluid pressure chamber while a non-driven wheel brake is supplied with a second brake fluid pressure from the second fluid pressure chamber. A driven wheel brake fluid pressure control valve is disposed in the first fluid passage and controls the first brake fluid pressure by adjusting the inflow/outflow amount of a first brake fluid with respect to the driven wheel brake. A nondriven wheel brake fluid pressure control valve is disposed in the second fluid passage and controls the second brake fluid pressure by adjusting the inflow/outflow amount of a second brake fluid with respect to the non-driven wheel brake. A fluid pressure pump is connected with the driven wheel brake pressure control valve and the non-driven wheel brake pressure control valve. The fluid pressure pump sucks the first brake fluid and the second brake fluid from the driven wheel brake and the non-driven wheel brake via the driven wheel brake fluid pressure control valve and the non-driven wheel brake fluid pressure control valve, respectively. The fluid pressure pump also discharges the sucked first brake fluid and the sucked second brake fluid to an upstream side of the driven wheel brake fluid pressure control valve and an upstream side of the nondriven wheel brake fluid pressure control valve. A control unit controls the driven wheel brake pressure and activates the auxiliary control valve for activating the booster in accordance with the slip rate of the driven wheel. The control unit activates the non-driven wheel brake fluid pressure control valve for interrupting the supply of the second brake fluid to the non-driven wheel brake when a predetermined time has elapsed from the activation of the booster or when the fluid brake pressure in the second fluid pressure chamber exceeds a set value, and thereafter controls the driven wheel brake fluid pressure control valve for adjusting the first brake fluid pressure by controlling the driven wheel brake fluid pressure in accordance with the slip rate of the driven wheel while driving the fluid pressure pump.

BRIEF DESCRIPTION OF THE DRAWING FIGURES

The above and other features and advantages of the present invention will become more apparent and more readily appreciated from the following detailed description of a preferred exemplary embodiment of the present invention, considered in connection with the accompanying drawing figures, in which like elements bear like reference numerals and wherein.

DETAILED DESCRIPTION OF THE PREFERRED EMBODIMENT

Figure 1:
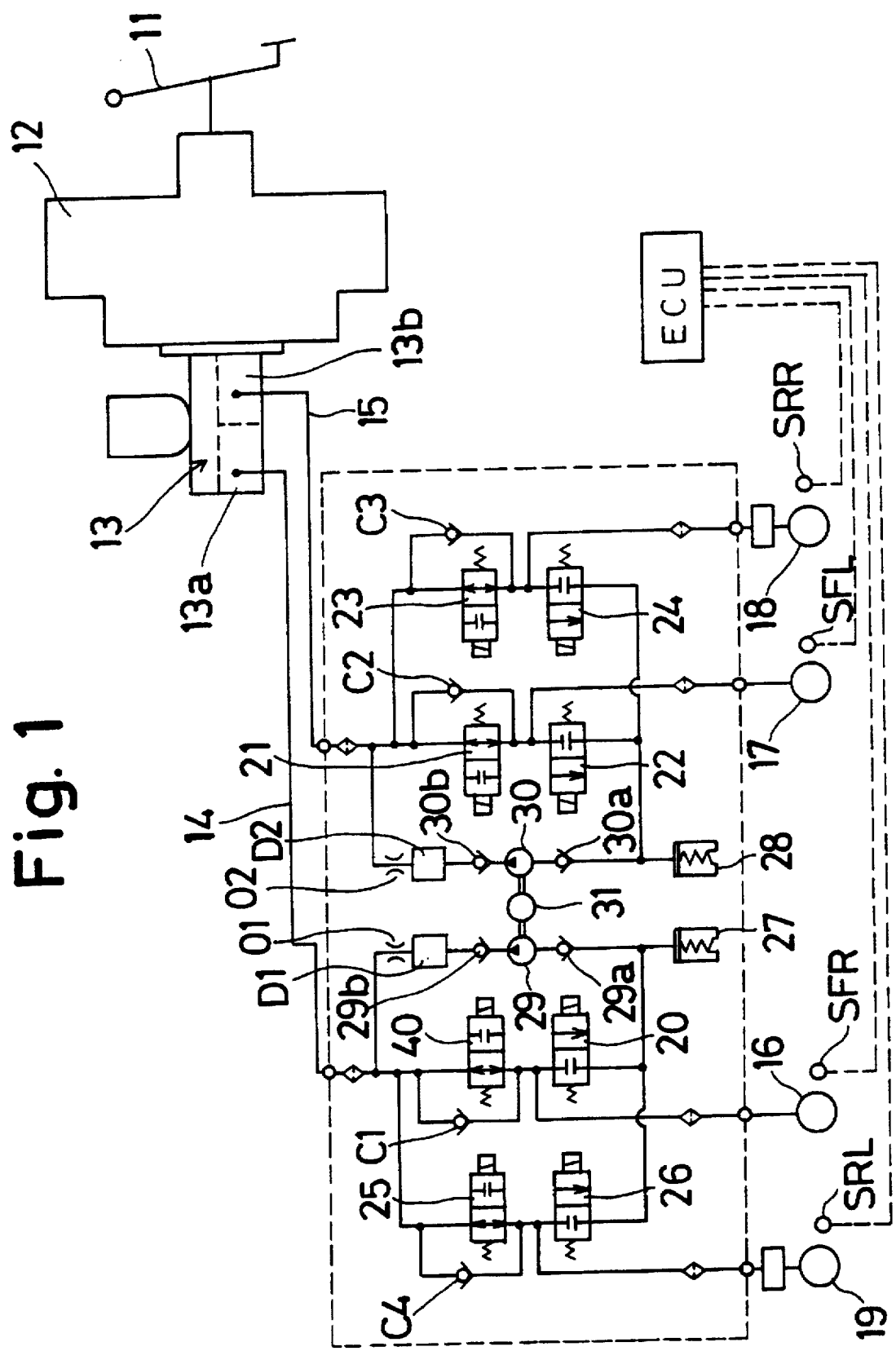
FIG. 1 is a schematic illustration of a brake traction control device in accordance with the present invention.

Referring first to FIG. 1, a brake traction control device according to the present invention includes a vacuum booster 12 for boosting a force applied to a brake pedal 11 when the brake pedal 11 is depressed toward the vehicle body floor (not shown). The resultant force is transmitted to a master cylinder 13 which is connected to the vacuum booster 12. The master cylinder 13 is provided with two pressure chambers 13$a$ and 13$b$, and is constructed as a so-called Rockied Type master cylinder. The first pressure chamber 13$a$ of the master cylinder 13 is connected, via a fluid passage 14, to a rear-left wheel brake 19 and a front-right wheel brake 16 which respectively brake the rear left wheel RL as a non driven wheel and the front right wheel FR as a driven wheel.

The second pressure chamber 13$b$ of the master cylinder 13 is connected, via a fluid passage 15, to a rear-right wheel brake 18 and a front-left wheel brake 17 which respectively brake the rear-right wheel RR as a non-driven wheel and the front left wheel FL as a driven wheel, respectively.

A normally opened solenoid valve 40 and a normally closed solenoid valve 20 are disposed in the fluid passage 14 between the first fluid pressure chamber 13$a$ and the front-right wheel brake 16. A normally opened solenoid valve 25 and a normally closed solenoid valve 26 are disposed in the fluid passage 14 between the first fluid pressure chamber 13a and the rear-left wheel brake 19. Also, a normally opened solenoid valve 21 and a normally closed solenoid valve 22 are disposed in the fluid passage 15 between the second fluid pressure chamber 13b and the front left wheel-brake 17. Further, a normally opened solenoid valve 23 and a normally closed solenoid valve 24 are disposed in the fluid passage 15 between the second fluid pressure chamber 13b and the rear right wheel brake 18.

The solenoid valves 40 and 20 constitute a brake fluid pressure control valve means for controlling the flowing-in and flowing-out of brake fluid with respect to the front-right wheel brake 16. The solenoid valves 21 and 22 constitute a brake fluid pressure control valve means for controlling the flowing-in and flowing-out of brake fluid with respect to the front left wheel brake 17. The solenoid valves 23 and 24 constitute a brake fluid pressure control valve means for controlling the flowing-in and flowing-out of brake fluid with respect to the left-right wheel brake 18. The solenoid valves 25 and 26 constitute a brake fluid pressure control valve means for controlling the flowing-in and flowing-out of brake fluid with respect to the rear left wheel brake 19.

A reservoir 27 is connected to the solenoid valves 20 and 26 to temporarily store brake fluid which has flowed out from the solenoid valves 20 and 26. A reservoir 28 is connected to the solenoid valves 22 and 24 to temporarily store brake fluid which has flowed out from the solenoid valves 22 and 24. A fluid pressure pump 29 is connected to the reservoir 27 so as to suck the brake fluid stored therein via a sucking valve 29a, and the resultant brake fluid is discharged or returned to the fluid pressure passage 14 via a discharging valve 29b, a damper chamber D1 and an orifice 01 which are arranged in that order. A fluid pressure pump 30 is connected to the reservoir 28 to suck the brake fluid stored therein via a sucking valve 30a, and the resultant brake fluid is discharged or returned to the fluid pressure passage 15 via a discharging valve 30b, a damper chamber D2 and an orifice 02 which are arranged in that order. The fluid pressure pumps 29 and 30 are driven by a common electric motor 31.

Check valves or one-way valves C1, C2, C3 and C4 are provided in parallel with respective ones of the solenoid valves 40, 21, 23 and 25 to permit fluid flow from each wheel brake to the master cylinder 13.

Figure 2:
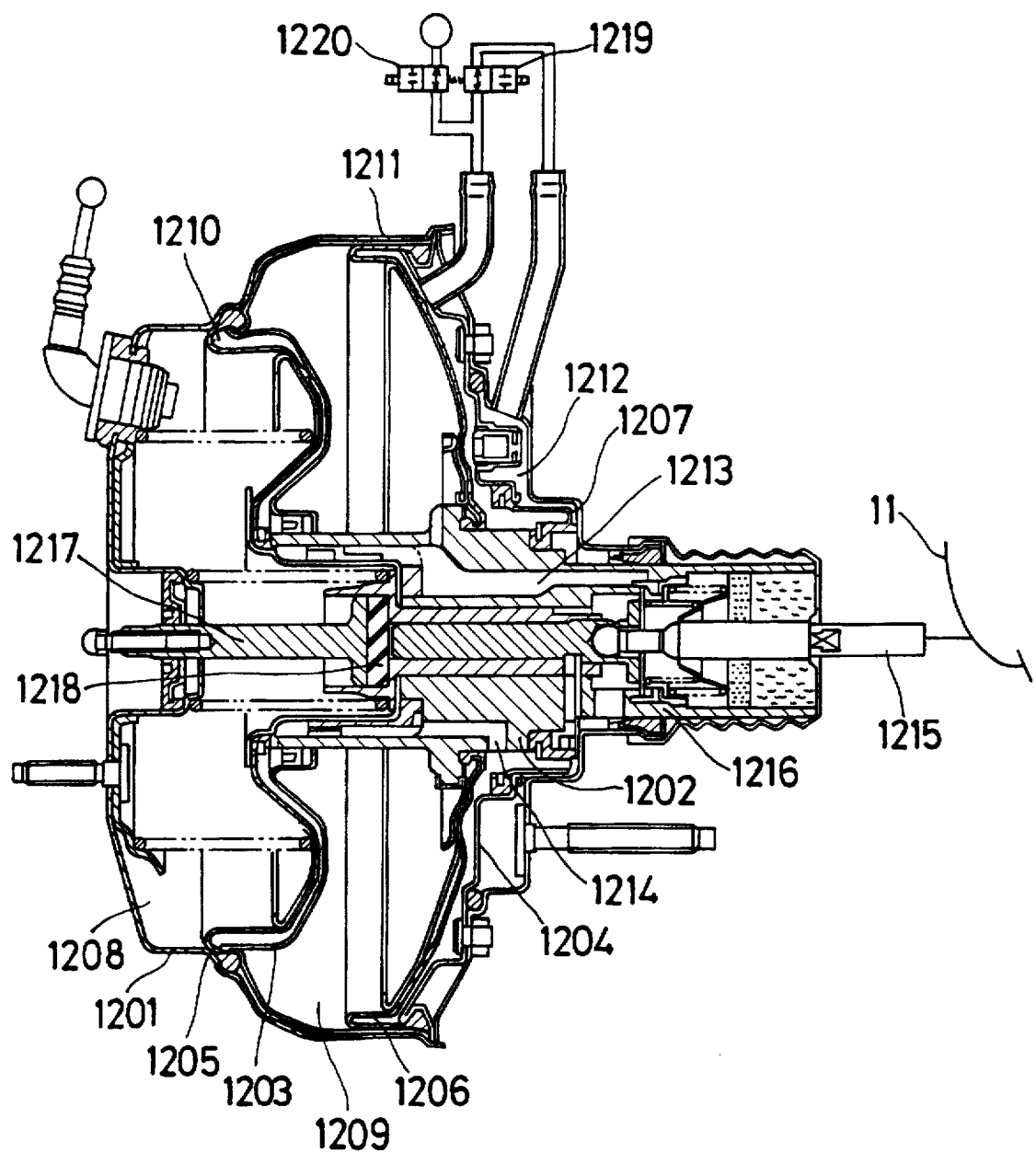
FIG. 2 is a cross-sectional view of a vacuum booster utilized in the brake traction control device shown in FIG. 1.

FIG. 2 illustrates a detailed construction of the vacuum booster 12. The vacuum booster 12 includes a housing 1201 in which are defined various chambers. In particular, a low pressure chamber 1208, a variable pressure chamber 1210, a low pressure chamber 1209, a variable pressure chamber 1211 and a variable pressure chamber 1212 are defined in the housing 1201 by a power piston 1202, walls 1203 and 1204, and diaphragms 1205, 1206 and 1207. The low pressure chamber 1208 is connected to a vacuum source such as an engine intake manifold (not shown) and is in fluid communication with the low pressure chamber 1210 via a passage 1213 formed in the power piston 1202. In addition, the variable pressure chamber 1210 is in fluid communication with the variable pressure chamber 1211 via a passage 1214 formed in the power piston. In the power piston 1202, there is provided a main control valve 1216 which is operatively connected to the brake pedal 11 via an input rod 1215.

A reaction rubber disk 1218 is disposed between the power piston and an output rod 1217. The variable pressure chamber 1211 is in fluid communication with the variable pressure chamber 1212 via a normally opened solenoid valve 1219. The variable pressure chamber 1211 is exposed to atmospheric pressure via a normally closed solenoid valve 1220. When the brake pedal 11 is not depressed, the main control valve 121b establishes fluid communication between the variable pressure chamber 1212 and the low pressure chamber 1208, to thereby connect the variable pressure chambers 1210 and 1211 to the low pressure chamber 1208 via the variable pressure chamber 1212. Thus, the variable pressure chambers 1210, 1211 and 1212 are under a negative pressure similar to that in the low pressure chambers 1208 and 1209 so that no assisting or promoting force is-applied to the power piston 1202.

When the brake pedal 11 is depressed, the main control valve 1216 interrupts the fluid communication between the variable pressure chamber 1212 and the low pressure chamber 1208, thereby establishing fluid communication of the variable pressure chamber 1212 to the atmospheric pressure. The atmospheric pressure is introduced into the variable pressure chamber 1212 and the resultant atmospheric pressure flows through the solenoid valve 1219, the variable pressure chamber 1211, the passage 1214 and the variable pressure chamber 1210, thereby raising the pressure in the variable pressure chamber 1210 and the variable pressure chamber 1211 above the pressure in each of the low pressure chambers 1208 and 1209. Thus, due to the resultant pressure differential, an assistance or promoting force is applied to the power piston 1202 and the resultant assistance force is transmitted via the reaction rubber disk 1218 to the output rod 1217. The reaction rubber disk 1218 applies a reaction force to the main control valve 1216 which is in proportion to the transmitted force from the power piston 1202 to the output rod 1207. On the basis of the result of a comparison of the force applied to the brake pedal 11 to the main control valve 1216 and the reaction force applied from the reaction rubber disk 1218 to the main control valve 1216, the main control valve 1216 is brought into connection with either the variable pressure chamber 1212 or the atmospheric pressure so that the depressing force at the brake pedal 11 is boosted and the resultant or boosted force is outputted from the output rod 1217.

While the brake pedal 11 is not depressed, if the solenoid valves 1219 and 1220, which constitute an auxiliary control valve, are activated or energized, the variable chambers 1210 and 1211 are isolated from the variable pressure chamber 1212 and are brought into fluid communication with atmospheric pressure, thereby increasing the pressure in each of the variable chambers 1210 and 1211. Thus, an assistance or promoting force is applied to the power piston 1202 and is transmitted via the reaction rubber disk 1218 to the output rod 1217 to be outputted therefrom. Concurrently, the main control valve 1216 connects the variable pressure chamber 1212 to the low pressure chamber 1208. Since the variable pressure chamber 1212 is isolated from the variable chambers 1210 and 1211 by the solenoid valve 1219, the pressure increase in each of the variable chambers 1210 and 1211 is not prevented.

The solenoid valves 1219 and 1220 shown in FIG. 2, the solenoid valves 40, 20, 21, 22, 23, 24, 25 and 26 shown in FIG. 1, and the electric motor 31 shown in FIG. 1 are set to be controlled by an electric control unit ECU shown in FIG. 1.

Figure 3:
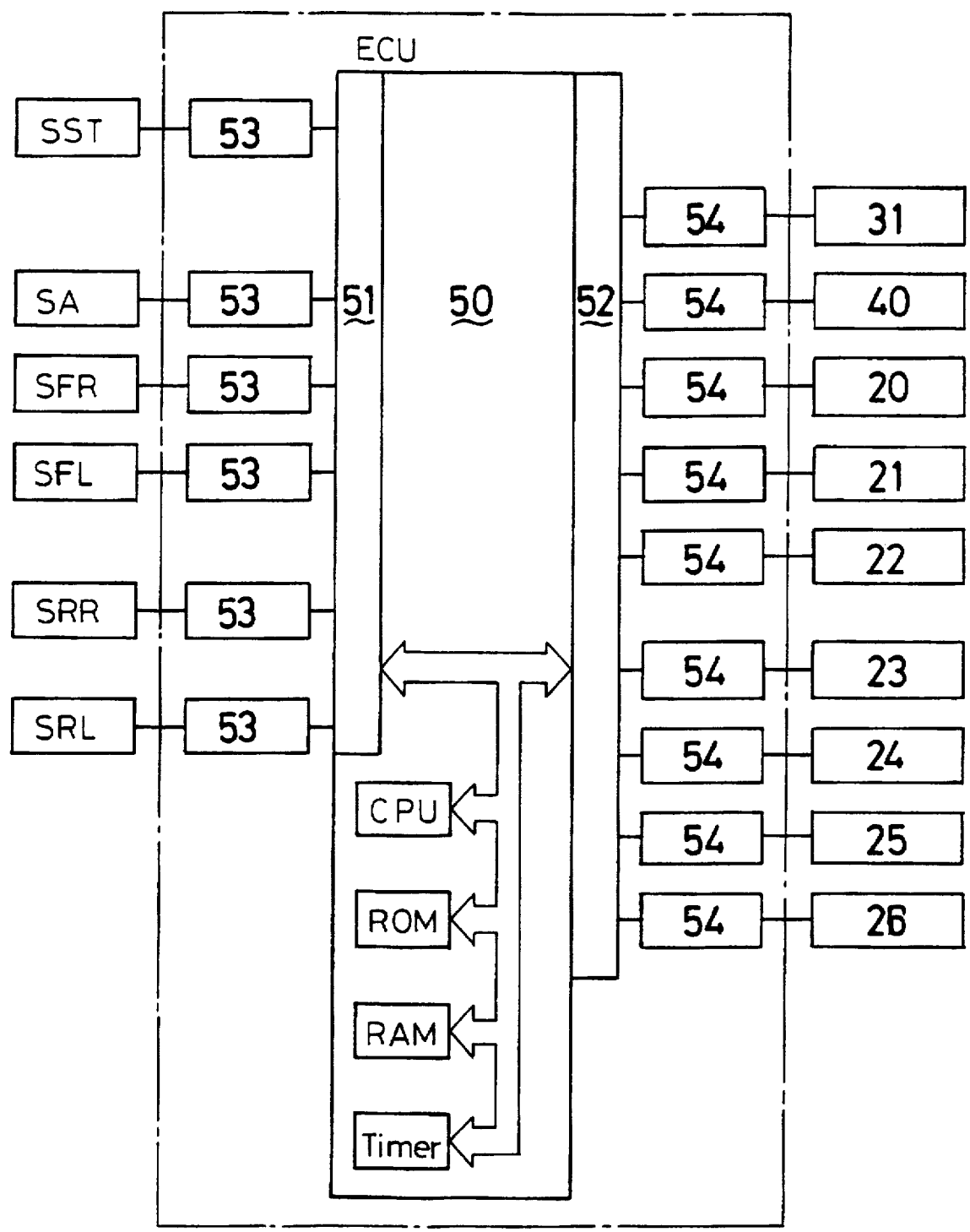
FIG. 3 is a block diagram of an electric control unit utilized in the brake traction control device shown in FIG. 1.

As shown in FIG. 3, the electric control unit ECU receives signals from wheel rotational speed sensors SFR, SFL, SRR and SRL which are provided at the front-right wheel FR, the front-left wheel FL, the rear-right wheel RR and the rear-left wheel RL, respectively. The ECU also receives an output signal from an acceleration pedal switch SA which is turned on when the acceleration pedal (not shown) is depressed, and an output signal from a stop switch SST which is turned on when the brake pedal 11 is depressed.

As further shown in FIG. 3, the electric control unit ECU include a micro-computer or micro-processor 50. The micro-computer 50 has a CPU, a ROM, a RAM, a timer, an input port 51 and an output port 52 which are mutually connected with each other via a bus (not shown). The signals from the wheel rotational speed sensors SFR, SFL, SRR and SRL, the acceleration pedal switch SA and the stop switch SST are fed via respective amplifier circuits 53 and the input port 51 to the CPU. From the output port 52 of the electric control unit ECU, operation signals or commands are issued to the solenoid valves 40, 20, 21, 22, 23, 24, 25 and 26, and the electric motor 31 via respective driving circuits 54. In the micro-computer 50, a program to be executed according to the flow chart shown in FIG. 4 is stored in the ROM, the CPU executes the program while an ignition switch (not shown) is closed, and the RAM stores temporally one or more variables which are required in the execution of the program.

Figure 4:
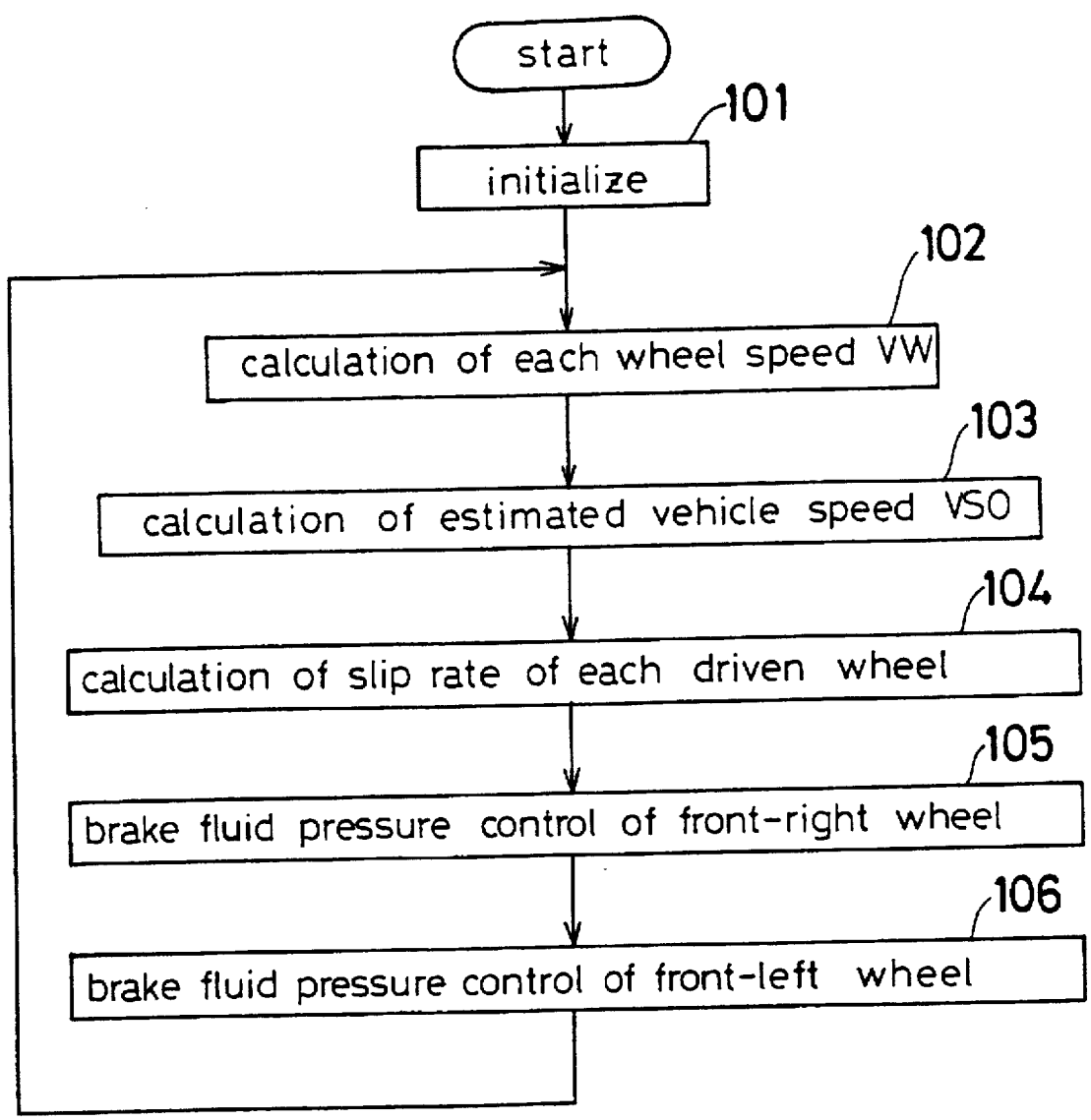
FIG. 4 is a flow-chart showing control aspects of the brake traction control device shown in FIG. 1.

In operation, upon closure of the ignition switch, an execution of the program corresponding to the flow-chart shown in FIG. 4 is initiated or started. In step 101, an initialization is performed and various variables, an estimated vehicle speed VSO which represents the vehicle's speed, each wheel speed VW and other factors are reset or cleared. In step 102, on the basis of the signal from the wheel rotational speed sensors SFR, SFL, SRR and SRL, the wheel speed VW for each wheel is calculated. In step 103, on the basis of the speed of the non-driven wheels, the estimated vehicle speed VSO is calculated. In the next step or step 104, a slip rate S of each driven wheel (the front-right wheel 16/the front-left wheel 17) is calculated. In step 105, a brake fluid pressure control of the front-right wheel 16 is established, and in step 106 a brake fluid pressure control of the front-left wheel 17 is established. After execution of step 106, the control returns to step 102.

Figure 5:
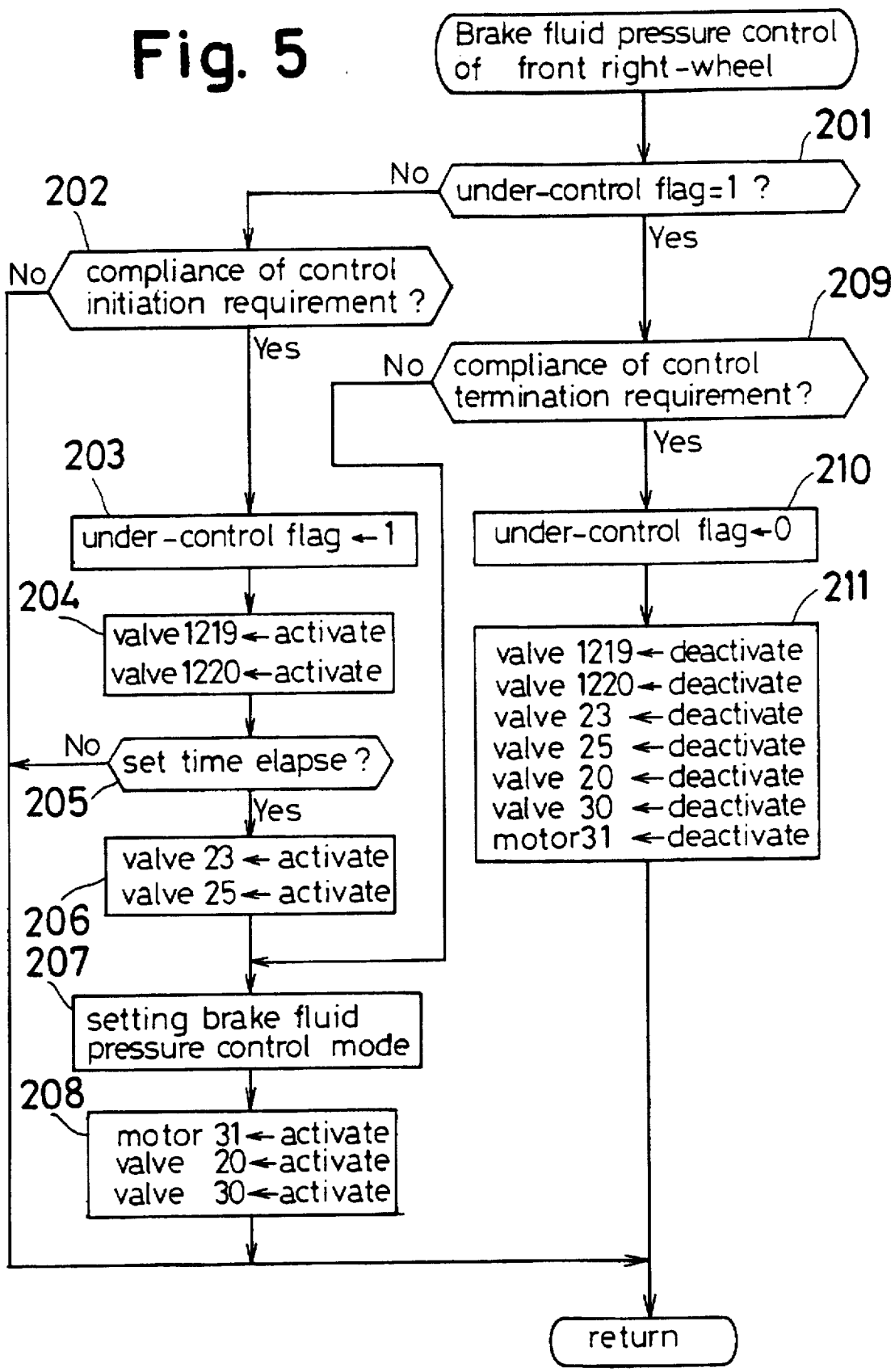
FIG. 5 is a flow-chart showing control aspects of the fluid pressure in the front right wheel brake utilized in connection with the embodiments of the invention shown in FIG. 1.

The detailed operation of the brake fluid pressure control of the front-right wheel 16 in step 105 is shown in FIG. 5. At first, in step 201, it is determined whether or not an under-control flag is "1" for judging whether or not the brake traction control is currently established. If the result is negative, step 202 is executed for checking whether or not the control initiation requirements have been met or established. The control initiation requirements are met when the stop switch SST is off, the acceleration pedal switch SA is on, the estimated vehicle speed VSO is not greater than a predetermined value and the slip rate S of the front-left wheel 17 is not less than a predetermined value. If the control initiation requirements are found to be met, step 203 is executed for setting the under-control flag to "1", and in turn step 204 is executed for activating the solenoid valves 1219 and 1220, thereby activating the vacuum booster 12. Thus, brake fluid pressure is supplied from the first fluid pressure chamber 13a to the wheel brakes 16 and 19, and brake fluid pressure is supplied from the second fluid pressure chamber 13b to the wheel brakes 17 and 18.

Next, step 205 is executed for checking whether a set or predetermined time has elapsed from the time of activation of each of the solenoid valves 1219 and 1220. This set or predetermined time represents the time duration associated with the pressure in the second fluid pressure chamber 13b reaching a pressure of about 2–3 Kg/cm² after activation of the solenoid valves 1219, 1220. This set time can be readily derived depending upon the parameters and other associated features of the system. The aforementioned fluid pressure and the associated set time are designed to prevent brake drag phenomena in the non-driven wheel brakes.

If the result in step 205 is positive or true, step 206 is executed and the solenoid valves 23 and 25 are activated, thereby preventing the brake fluid pressure in each of the rear right wheel brake 18 and the rear left wheel brake 19 from being increased. At this time, the brake fluid pressure in each of the rear-right wheel brake 18 and the rear-left wheel brake 19 is relatively low and therefore no braking effect is generated. In the master cylinder, even though the pressure in each of the fluid pressure chambers 13a and 13b is raised after a piston-cup passes over a compensating port, the piston-cup is prevented from entering into the compensating port. In step 207, the control mode for the brake fluid pressure is selected from a pressure increasing mode and a pressure decreasing mode. In step 208, the electric motor 31 is turned on and the solenoid valves 21 and 22 are controlled on the basis of the mode selected in step 207. For example, in the case of the pressure increasing mode, both of the solenoid valves 21 and 22 are deactivated and in the case of the pressure decreasing mode, both the solenoid valves 21 and 22 are activated.

If the result of step 201 indicates that the under control flag is "1", step 209 is executed for confirming that a control termination condition is met or established. If the result is false or negative, the control goes to step 207. If the control termination condition is found to be met, step 210 is executed for resetting the under-control flag to "0", and in step 211, the solenoid valves 1219, 1220, 23 and 25, the electric motor 31, and the solenoid valves 40 and 20 are deactivated. Thereafter, the control returns to the main routine shown in FIG. 4.

The solenoid valves 40, 20 and the slip rate of the front-right wheel 16 are replaced with the solenoid valves 21, 22 and the slip rate of the front left wheel in the flow chart shown in FIG. 5, so that the brake fluid pressure control of the front-left wheel brake 17 is performed on the basis of the resultant flowchart.

As described above, the control unit activates the non-driven wheel brake fluid pressure control valves 23, 25 for interrupting the supply of brake fluid to the non-driven wheel brakes (i.e., the rear right wheel brake 18 and the rear left wheel brake 19) when a predetermined time has elapsed from activation of the booster 12. In an alternative embodiment of the invention illustrated in FIGS. 6–8, the system can be designed so that the control unit activates the non-driven wheel brake fluid pressure control valves 23, 25 to interrupt the supply of brake fluid to the non-driven wheel brakes 18, 19 when the fluid brake pressure in the second fluid pressure chamber 13b exceeds a set value. In this regard, reference is made to FIG. 6 which schematically illustrates the brake traction control device.

Figure 6:
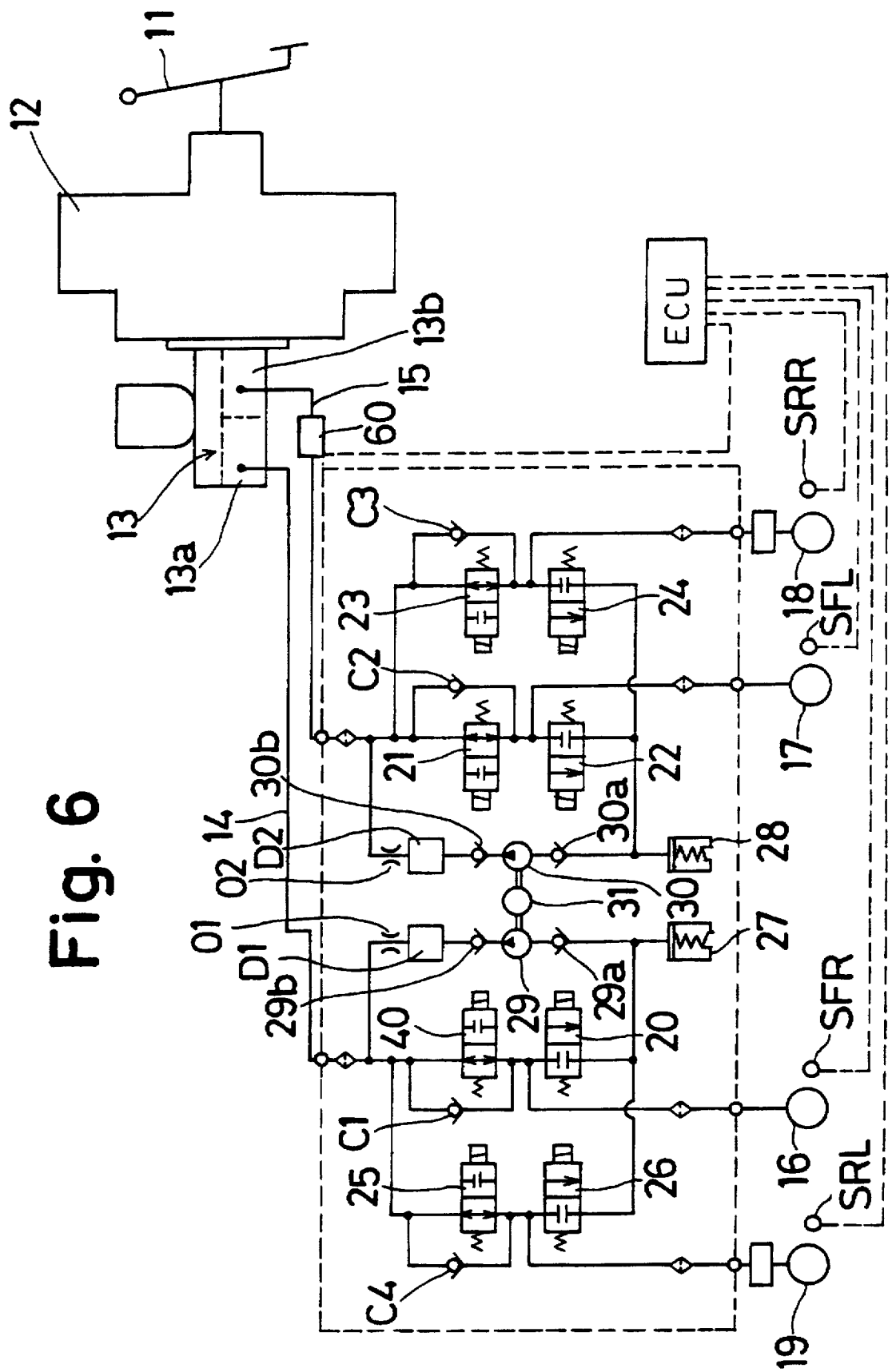
FIG. 6 is a schematic illustration of a brake traction control device in accordance with another embodiment of the present invention.
Figure 7:
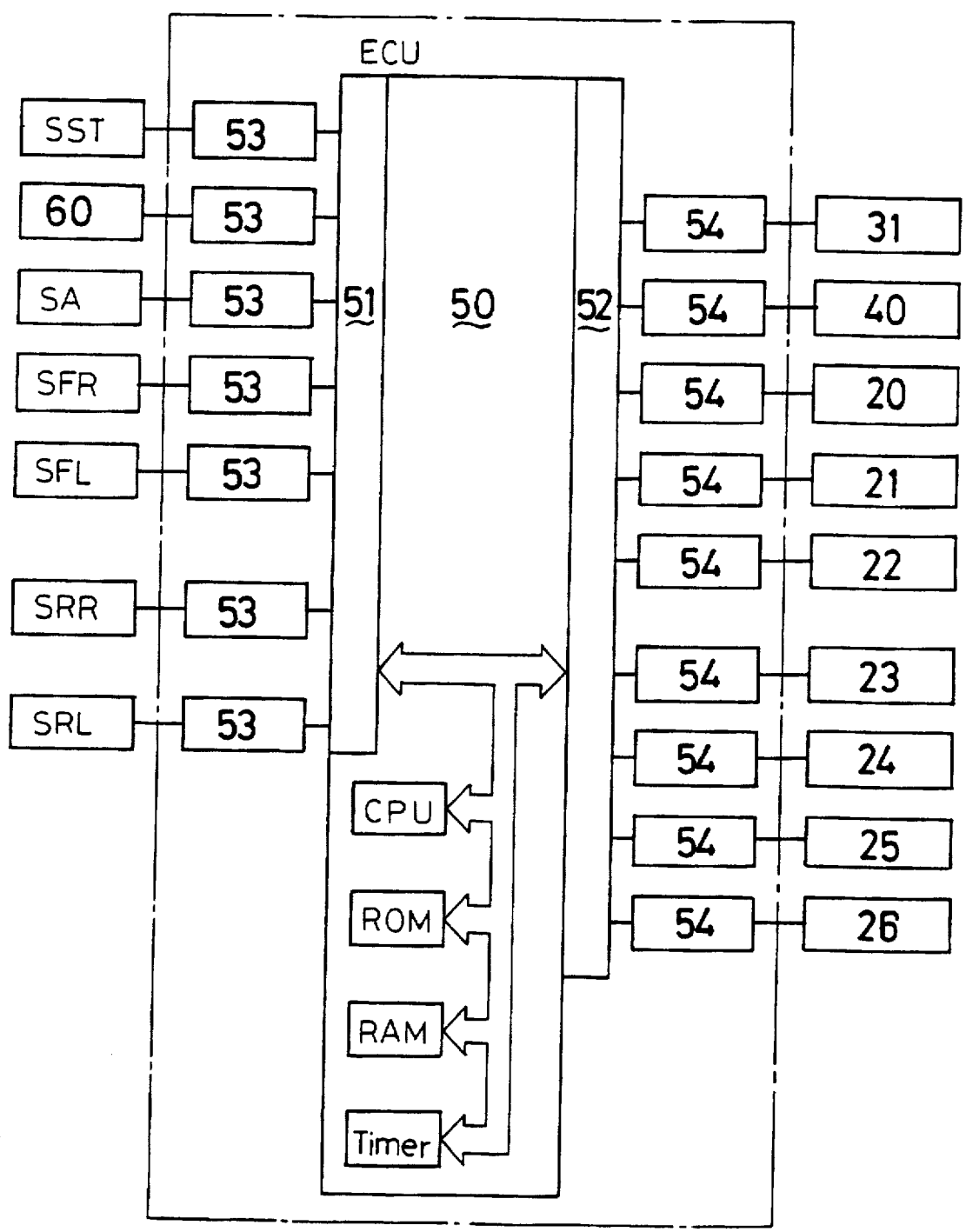
FIG. 7 is a block diagram of an electric control unit utilized in the brake traction device shown in FIG. 6.

The system illustrated in FIG. 6 is substantially the same as that illustrated in FIG. 1 except that an arrangement is provided for measuring the fluid brake pressure in the second pressure chamber 13b of the master cylinder 13. That is, a fluid passage 15 is connected to the second pressure chamber 13b and a fluid pressure sensor 60 is disposed in that fluid passage 15. The fluid pressure sensor 60 is connected to the ECU as shown in FIG. 7 for inputting to the ECU a signal indicative of the fluid brake pressure in the second pressure chamber 13b.

Figure 8:
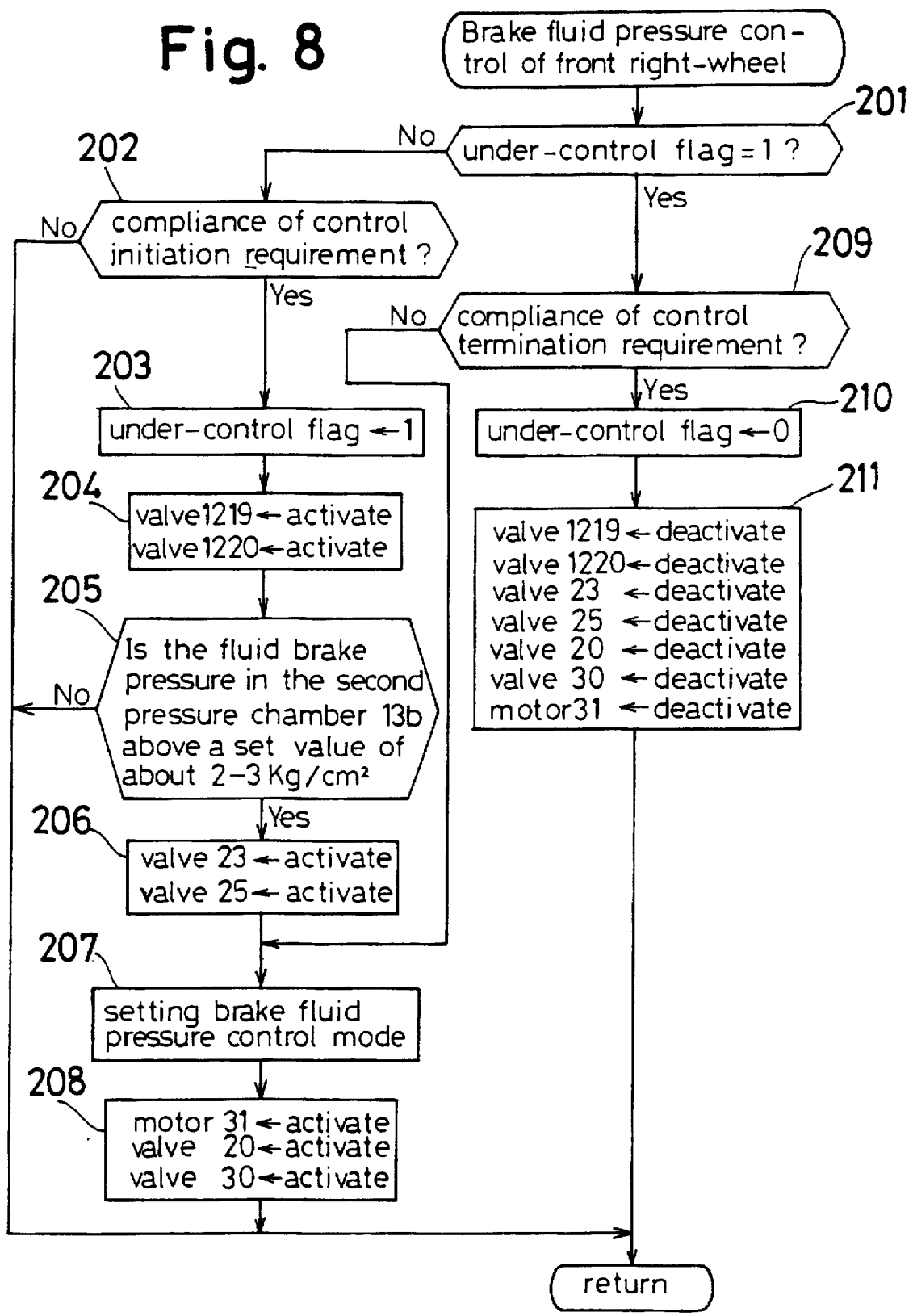
FIG. 8 is a flow-chart showing control aspects of the fluid pressure in the front right wheel brake in accordance with the embodiment of the invention illustrated in FIG. 6.

The operation of the brake fluid pressure control of the front-right wheel 16 in accordance with this alternative embodiment of the invention is shown in FIG. 8. The flow-chart shown in FIG. 8 is the same as that depicted in FIG. 5, except for step 205. In step 205, it is determined whether the fluid brake pressure in the second pressure chamber 13b is above a set or predetermined value. In the preferred embodiment, the set value is about 2–3 Kg/cm². This set or predetermined value of about 2–3 Kg/cm² is preferably set to avoid brake drag phenomena in the non-driven wheel brakes.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A traction control device for a vehicle comprising:
   a master cylinder;
   a vacuum booster having a main control valve for transmitting a pedal force to the master cylinder and an auxiliary control valve for applying a force to the master cylinder in the absence of a pedal force;
   a driven wheel brake connected to the master cylinder via a first fluid passage for being supplied with brake fluid from the master cylinder;
   a non-driven wheel brake connected to the master cylinder via a second fluid passage for being supplied with brake fluid from the master cylinder;
   a driven wheel brake fluid pressure control valve disposed in the first fluid passage for controlling brake fluid pressure in the driven wheel brake by adjusting the amount of brake fluid flowing into and out of the driven wheel brake;
   a non-driven wheel brake fluid pressure control valve disposed in the second fluid passage for controlling brake fluid pressure in the non-driven wheel brake by adjusting the amount of brake fluid flowing into and out of the non-drive wheel brake;
   a fluid pressure pump for sucking brake fluid from the driven wheel brake and the non-driven wheel brake via the driven wheel brake pressure control valve and the non-driven wheel brake fluid pressure control valve respectively, and for discharging brake fluid to an upstream side of the driven wheel brake fluid pressure control valve and an upstream side of the non-driven wheel brake fluid pressure control valve;
   a control unit for controlling brake fluid pressure, the control unit activating the auxiliary control valve for activating the booster according to a slip rate of the driven wheel in the absence of the pedal force, the control unit activating the non-driven wheel brake fluid pressure control valve for interrupting the supply of brake fluid from the master cylinder to the non-driven wheel brake after a predetermined time has lapsed from the activation of the booster so that the non-driven wheel brake initially functions as a brake fluid receiver to prevent an abnormally fast fluid pressure increase in the master cylinder, and thereafter controlling the driven wheel brake fluid pressure control valve for controlling brake fluid pressure in the driven wheel brake by adjusting the amount of brake fluid flowing into and out of the driven wheel brake in accordance with the slip rate of the driven wheel brake while driving the fluid pressure pump.

2. A traction control device as recited in claim 1, wherein the predetermined time is set based on the time required for the brake fluid pressure in the non-driven wheel brake to be increased to a set valve after activation of the auxiliary control valve.

3. A traction control device as recited in claim 1, wherein said brake booster includes first, second and third variable pressure chambers, said first and second variable pressure chambers being in fluid communication with each other, said auxiliary control valve being disposed between said second and third variable pressure chambers to control fluid communication between the second and third variable pressure chambers.

4. A traction control device as recited in claim 3, wherein said auxiliary control valve includes a normally open valve which is movable to a closed position to interrupt communication between the second and third variable pressure chambers, and a normally closed valve which is movable to an open position to communicate the second variable pressure chamber with atmosphere.

5. A traction control device for a vehicle comprising:
   a master cylinder;
   a vacuum booster having a main control valve for transmitting a pedal force to the master cylinder and an auxiliary control valve for applying a force to the master cylinder in the absence of a pedal force;
   a driven wheel brake connected to the fluid pressure chamber via a first fluid passage for being supplied with brake fluid from the master cylinder;
   a non-driven wheel brake connected to the fluid pressure chamber via a second fluid passage for being supplied with brake fluid from the master cylinder;
   a driven wheel brake fluid pressure control valve disposed in the first fluid passage for controlling brake fluid pressure in the driven wheel brake by adjusting the amount of brake fluid flowing into and out of the driven wheel brake;
   a non-driven wheel brake fluid pressure control valve disposed in the second fluid passage for controlling brake fluid pressure in the non-driven wheel brake by adjusting the amount of brake fluid flowing into and out of the non-driven wheel brake;
   a fluid pressure pump for sucking brake fluid from the driven wheel brake and the non-driven wheel brake via the driven wheel brake fluid pressure control valve and the non-driven wheel brake fluid pressure control valve respectively, and for discharging brake fluid to an upstream side of the driven wheel brake fluid pressure control valve and an upstream side of the non-driven wheel brake fluid pressure control valve;
   a control unit for controlling brake fluid pressure, the control unit activating the auxiliary control valve for activating the booster according to a slip rate of the driven wheel, the control unit activating the non-driven wheel brake fluid pressure control valve for interrupting the supply of brake fluid to the non-driven wheel brake when fluid brake pressure in the master cylinder exceeds a set value so that the non-driven wheel brake initially functions as a brake fluid receiver to prevent an abnormally fast pressure increase in the master cylinder, and thereafter controlling the driven wheel brake fluid pressure control valve for controlling brake fluid pressure in the driven wheel brake by adjusting the amount of brake fluid in the driven wheel brake in accordance with the slip rate of the driven wheel brake while driving the fluid pressure pump.

6. A traction control device as recited in claim 5, wherein the set value of the fluid brake pressure in the master cylinder is adjusted to avoid brake drag phenomena.

7. A traction control device as recited in claim 5, wherein the set value of the fluid brake pressure in the master cylinder is about 2–3 kg/cm$^3$.

8. A traction control device as recited in claim 5, wherein said brake booster includes first, second and third variable pressure chambers, said first and second variable pressure chambers being in fluid communication with each other, said auxiliary control valve being disposed between said second and third variable pressure chambers to control fluid communication between the second and third variable pressure chambers.

9. A traction control device as recited in claim 8, wherein said auxiliary control valve includes a normally open valve which is movable to a closed position to interrupt communication between the second and third variable pressure chambers, and a normally closed valve which is movable to an open position to communicate the second variable pressure chamber with atmosphere.

\* \* \* \* \*